(12) United States Patent
Takehara et al.

(10) Patent No.: US 11,010,019 B2
(45) Date of Patent: May 18, 2021

(54) VIDEO DATA STREAMING MONITORING DEVICE, METHOD, AND PROGRAM, AND TERMINAL DEVICE, AND VIDEO DATA STREAMING MONITORING SYSTEM

(71) Applicant: JVC KENWOOD Corporation, Yokohama (JP)

(72) Inventors: Hideki Takehara, Yokohama (JP); Akinori Suyama, Yokohama (JP); Tatsumi Naganuma, Yokohama (JP); Satoru Hirose, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 175 days.

(21) Appl. No.: 16/059,076

(22) Filed: Aug. 9, 2018

(65) Prior Publication Data

US 2019/0095076 A1    Mar. 28, 2019

(30) Foreign Application Priority Data

Sep. 22, 2017  (JP) .............................. JP2017-182272

(51) Int. Cl.
*G06F 3/0481* (2013.01)
*H04N 21/4223* (2011.01)
(Continued)

(52) U.S. Cl.
CPC ........ *G06F 3/04817* (2013.01); *G06F 3/0482* (2013.01); *H04N 17/00* (2013.01);
(Continued)

(58) Field of Classification Search
CPC ... G06F 3/04817; G06F 3/0482; H04N 17/00; H04N 21/6379; H04N 21/44209;
(Continued)

(56) References Cited

U.S. PATENT DOCUMENTS 7,177,323 B2 * 2/2007 Yavatkar ........... H04L 29/06027
                                                        370/260
9,883,370 B2 * 1/2018 Kerning ................ H04W 12/06
(Continued)

FOREIGN PATENT DOCUMENTS

JP         11-102495        4/1999
JP         2003-134045 A    5/2003

*Primary Examiner* — Kieu D Vu
*Assistant Examiner* — Blaine T. Basom
(74) *Attorney, Agent, or Firm* — Brundidge & Stanger, P.C.

(57) ABSTRACT

A camera thumbnail image acquisition unit acquires a first thumbnail image from a camera. A distribution server thumbnail image acquisition unit acquires a second thumbnail image from a distribution server. A thumbnail image selection unit selects one of the first thumbnail image and the second thumbnail image as a thumbnail image that should be displayed. A camera information acquisition unit acquires camera information including streaming execution information indicating whether the camera is streaming. The thumbnail image selection unit refers to the streaming execution information to select the second thumbnail image as the thumbnail image that should be displayed when the camera is streaming and to select the first thumbnail image as the thumbnail image that should be displayed when the camera is not streaming.

7 Claims, 5 Drawing Sheets

(51) Int. Cl.
  *H04N 21/431* (2011.01)
  *H04N 21/2343* (2011.01)
  *H04N 21/2187* (2011.01)
  *H04N 21/442* (2011.01)
  *H04N 17/00* (2006.01)
  *G06F 3/0482* (2013.01)
  *H04N 21/6379* (2011.01)

(52) U.S. Cl.
  CPC . *H04N 21/2187* (2013.01); *H04N 21/234363* (2013.01); *H04N 21/4223* (2013.01); *H04N 21/4312* (2013.01); *H04N 21/44209* (2013.01); *H04N 21/6379* (2013.01)

(58) Field of Classification Search
  CPC ....... H04N 21/2187; H04N 21/234363; H04N 21/4312; H04N 21/4223; H04N 21/218; H04N 21/21805; H04N 21/234; H04N 21/238; H04N 21/239; H04N 21/24; H04N 21/2662; H04N 21/64723; H04N 21/64738; H04N 7/18
  See application file for complete search history.

(56) References Cited

U.S. PATENT DOCUMENTS

| | | | |
|---|---|---|---|
| 2014/0152834 A1* | 6/2014 | Kosseifi | H04N 21/21805 348/158 |
| 2016/0100329 A1* | 4/2016 | Miller | H04L 1/0017 370/235 |
| 2016/0381110 A1* | 12/2016 | Barnett | H04L 65/601 709/231 |
| 2018/0262783 A1* | 9/2018 | Yang | H04N 21/2187 |
| 2019/0081999 A1* | 3/2019 | Ikegami | H04N 21/23103 |

* cited by examiner

VIDEO DATA STREAMING MONITORING DEVICE, METHOD, AND PROGRAM, AND TERMINAL DEVICE, AND VIDEO DATA STREAMING MONITORING SYSTEM

BACKGROUND OF THE INVENTION

1. Field of the Invention

The present invention relates to a monitoring technology for video data streaming.

2. Description of the Related Art

Recently, progress has been made in cameras for business applications that are configured as IP cameras, and services of distributing a stream of captured video data have become popular. In this background, there is called for a system capable of managing streaming from a large number of cameras for business applications on a cloud in an integrated manner and monitoring the conditions of cameras and streaming.

For example, patent document 1 discloses a monitoring system for arranging and displaying videos taken by cameras at a plurality of monitoring sites side by side with map data. Patent document 2 discloses a broadcast streaming distribution system for subjecting a video from a camera in an area likely to be hit by a disaster to stream encoding in real time and distributing the encoded video to a mobile terminal.

[patent document 1] JP11-102495
[patent document 2] JP2003-134045

One problem with a streaming distribution system is that the load on the camera required for the encoding process is increased if it is attempted to monitor a video from the camera while the camera is streaming the video.

SUMMARY OF THE INVENTION

In this background, a purpose of the present invention is to provide a video data streaming monitoring technology capable of monitoring a video of a camera even while the camera is streaming a video.

The video streaming monitoring device according to an embodiment of the present invention is for monitoring video data streaming from a camera to a distribution server, and comprises: a first thumbnail image acquisition unit that acquires a first thumbnail image from the camera; a second thumbnail image acquisition unit that acquires a second thumbnail image from the distribution server; a thumbnail image selection unit that selects one of the first thumbnail image and the second thumbnail image as a thumbnail image that should be displayed; and a camera information acquisition unit that acquires camera information including streaming execution information indicating whether the camera is streaming. The thumbnail image selection unit refers to the streaming execution information to select the second thumbnail image as the thumbnail image that should be displayed when the camera is streaming and to select the first thumbnail image as the thumbnail image that should be displayed when the camera is not streaming.

Another embodiment of the present invention relates to a terminal device. The device is a terminal device connected to a video data streaming monitoring device for monitoring video data streaming from a camera to a distribution server via a network, the terminal device comprising: a synthesis unit that synthesizes, on a map, a thumbnail image of a video taken by a camera adjacent to a camera position on the map and attaches notification information to the thumbnail image for display, the notification information including a transmission quality of streaming from the camera to the distribution server or error information on the camera. The thumbnail image is transmitted from the distribution server when the camera is streaming, and the thumbnail image is transmitted from the camera when the camera is not streaming.

Another embodiment of the present invention relates to a video data streaming monitoring system. The video data streaming monitoring system includes a video data streaming monitoring device for monitoring video data streaming from a camera to a distribution server and a terminal device connected to the video data streaming device via a network, the video data streaming monitoring device comprising: a first thumbnail image acquisition unit that acquires a first thumbnail image from the camera; a second thumbnail image acquisition unit that acquires a second thumbnail image from the distribution server; a thumbnail image selection unit that selects one of the first thumbnail image and the second thumbnail image as a thumbnail image that should be displayed; and a camera information acquisition unit that acquires camera information including streaming execution information indicating whether the camera is streaming. The thumbnail image selection unit refers to the streaming execution information to select the second thumbnail image as the thumbnail image that should be displayed when the camera is streaming and to select the first thumbnail image as the thumbnail image that should be displayed when the camera is not streaming, the terminal device comprising: a synthesis unit that synthesizes, on a map, the first thumbnail image or the second thumbnail image selected by the thumbnail image selection unit adjacent to a camera position on the map and attaches notification information to the first thumbnail image or the second thumbnail image for display, the notification information including a transmission quality of streaming from the camera to the distribution server or error information on the camera.

Another embodiment of the present invention relates to a video data streaming monitoring method. The method is a video data streaming monitoring method for monitoring video data streaming from a camera to a distribution server, and comprises: acquiring camera information including streaming execution information indicating whether the camera is streaming; referring to the streaming execution information to select a second thumbnail image acquired from the distribution server as a thumbnail image that should be displayed when the camera is streaming and to select a first thumbnail image acquired from the camera as the thumbnail image that should be displayed when the camera is not streaming.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
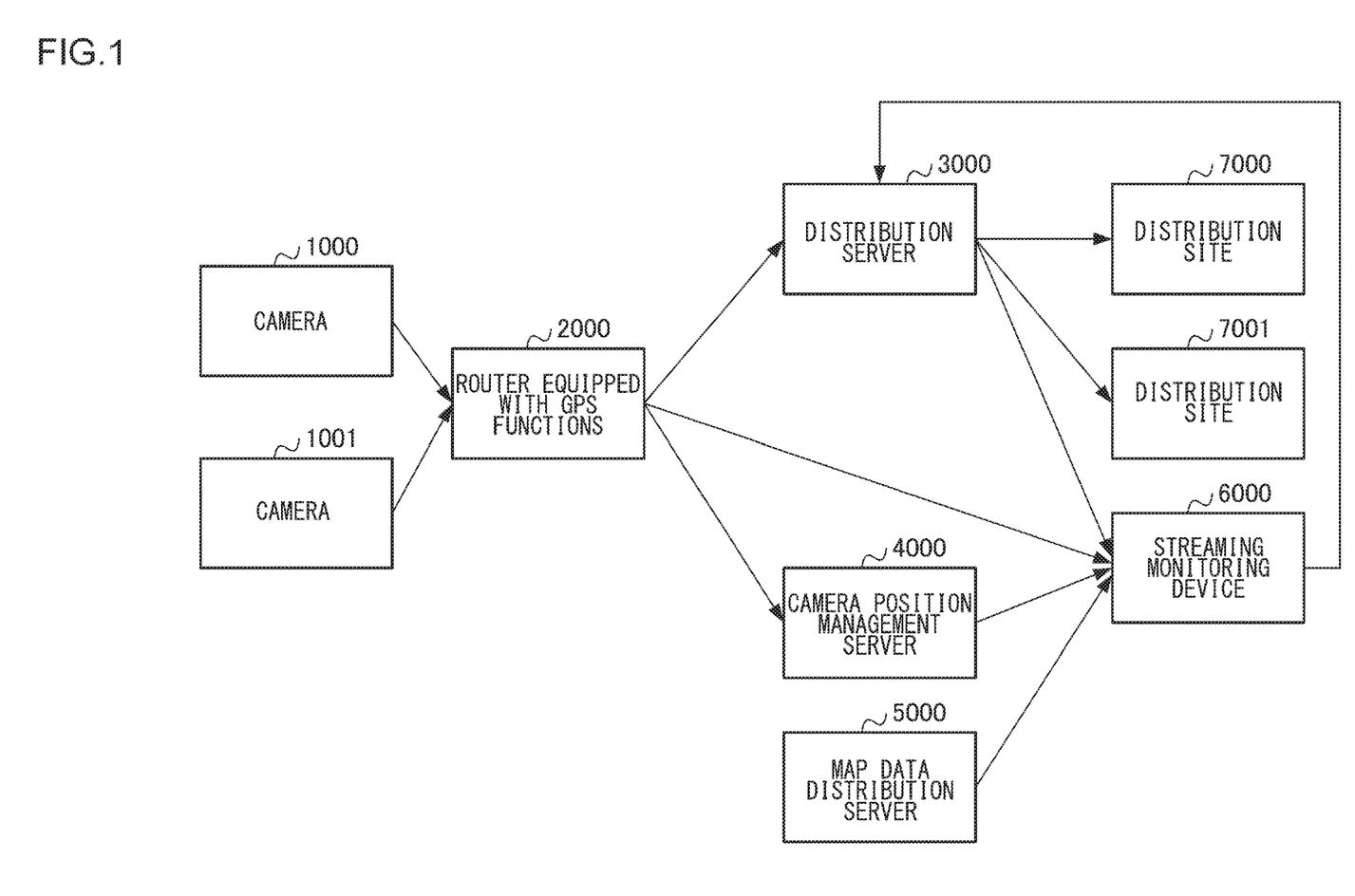
FIG. 1 shows a configuration of a video data streaming monitoring system according to the embodiment.

FIG. 1 shows a configuration of a video data streaming monitoring system according to the embodiment. The video data streaming monitoring system includes cameras 1000, 1001, a router 2000 equipped with GPS functions, a distribution server 3000, a camera position management server 4000, a map data distribution server 5000, a streaming monitoring device 6000, and distribution sites 7000, 7001.

The cameras 1000, 1001 are connected to the router 2000 equipped with GPS functions via Wireless LAN such as Wi-Fi. The description here relates to a mode in which the cameras 1000, 1001 are connected to the router 2000 equipped with GPS functions by wireless LAN. Alternatively, the cameras 1000, 1001 may be connected to the router 2000 equipped with GPS functions via USB, etc., or the cameras 1000, 1001 may have built-in GPS functions.

The router 2000 equipped with GPS functions is connected to the distribution server 3000, the camera position management server 4000, and the streaming monitoring device 6000 via a network. The distribution server 3000 is connected to the streaming monitoring device 6000 and the distribution sites 7000, 7001 via a network. The camera position management server 4000 is connected to the streaming monitoring device 6000 via a network. The map data distribution server 5000 is connected to the streaming monitoring device 6000 via a network. The streaming monitoring device 6000 is connected to the distribution server 3000 via a network.

The cameras 1000, 1001 encode the video taken at the respective sites and transmit streaming data to the distribution server 3000 via the router 2000 equipped with GPS functions. In this case, the streaming data represents a full High Definition (HD) video having an image size of 1920 pixels×1080 pixels, and the frame rate is 30 fps.

The distribution server 3000 transcodes the streaming data transmitted from the router 2000 equipped with GPS functions and transmits the transcoded data to one or more distribution sites 7000, 7001. The distribution server 3000 may distribute streaming data that differ in the resolution or frame rate to the distribution sites 7000, 7001, respectively. The plurality of distribution sites 7000, 7001 may be receivers of a plurality of different broadcast stations or a plurality of receivers of one broadcast station.

The distribution server 3000 is capable of distributing the streaming data transmitted from the router 2000 equipped with GPS functions to the streaming monitoring device 6000.

The cameras 1000, 1001 transmit a thumbnail image of the video being taken (called "camera thumbnail image") to the streaming monitoring device 6000 via the router 2000 equipped with GPS functions. The camera thumbnail image is, for example, a still image of the QVCA size. Further, the camera thumbnail image is compressed by intra-frame coding according to an image compression scheme such as JPEG and MPEG and is transmitted accordingly. Furthermore, the streaming monitoring device 6000 may acquire the camera thumbnail image from the cameras 1000, 1001 using a WEB API. It is noted that the WEB API is an application program interface to be called from a predefined program using HyperText Transfer Protocol (HTTP).

The distribution server 3000 transmits a thumbnail image of pre-transcoded streaming data transmitted from the router 2000 equipped with GPS functions (referred to as "streaming thumbnail image") or a thumbnail image of transcoded streaming data ("referred to as "distribution thumbnail image") to the streaming monitoring device 6000.

The router 2000 equipped with GPS functions transmits GPS information at least including the latitude and longitude to the camera position management server 4000 as camera position information on the cameras 1000, 1001. The description here relates to a mode in which the router 2000 equipped with GPS functions and the camera position management server 4000 are connected via a network. Alternatively, the router 2000 equipped with GPS functions and the camera position management server 4000 may be integrated to form a bridge equipped with GPS functions.

The camera position management server 4000 stores the GPS information input from the router 2000 equipped with GPS functions and transmits the GPS information as the camera position information to the streaming monitoring device 6000. It is noted that the GPS information is not always input to the camera position management server 4000 from the router 2000 equipped with the GPS functions. A user may input the GPS information to the camera position management server 4000 via a WEB screen displayed in a browser so that the GPS information may be recorded in the camera position management server 4000. Alternatively, the GPS information may be input to the camera position management server 4000 using a recording medium that stores the GPS information in advance so that the GPS information may be recorded in the camera position management server 4000.

The map data distribution server 5000 transmits map data to the streaming monitoring device 6000.

The streaming monitoring device 6000 transmits distribution control data to the distribution server 3000. The distribution server 3000 transcodes the streaming data transmitted from the cameras 1000, 1001 as appropriate based on the distribution control data and distributes the transcoded data to the distribution sites 7000, 7001.

The distribution sites 7000, 7001 receive the streaming data distributed from the distribution server 3000 and decodes the streaming data for use. The distribution sites 7000, 7001 are capable of isolating the streaming data transmitted from the cameras 1000, 1001 from each other for use.

Figure 2:
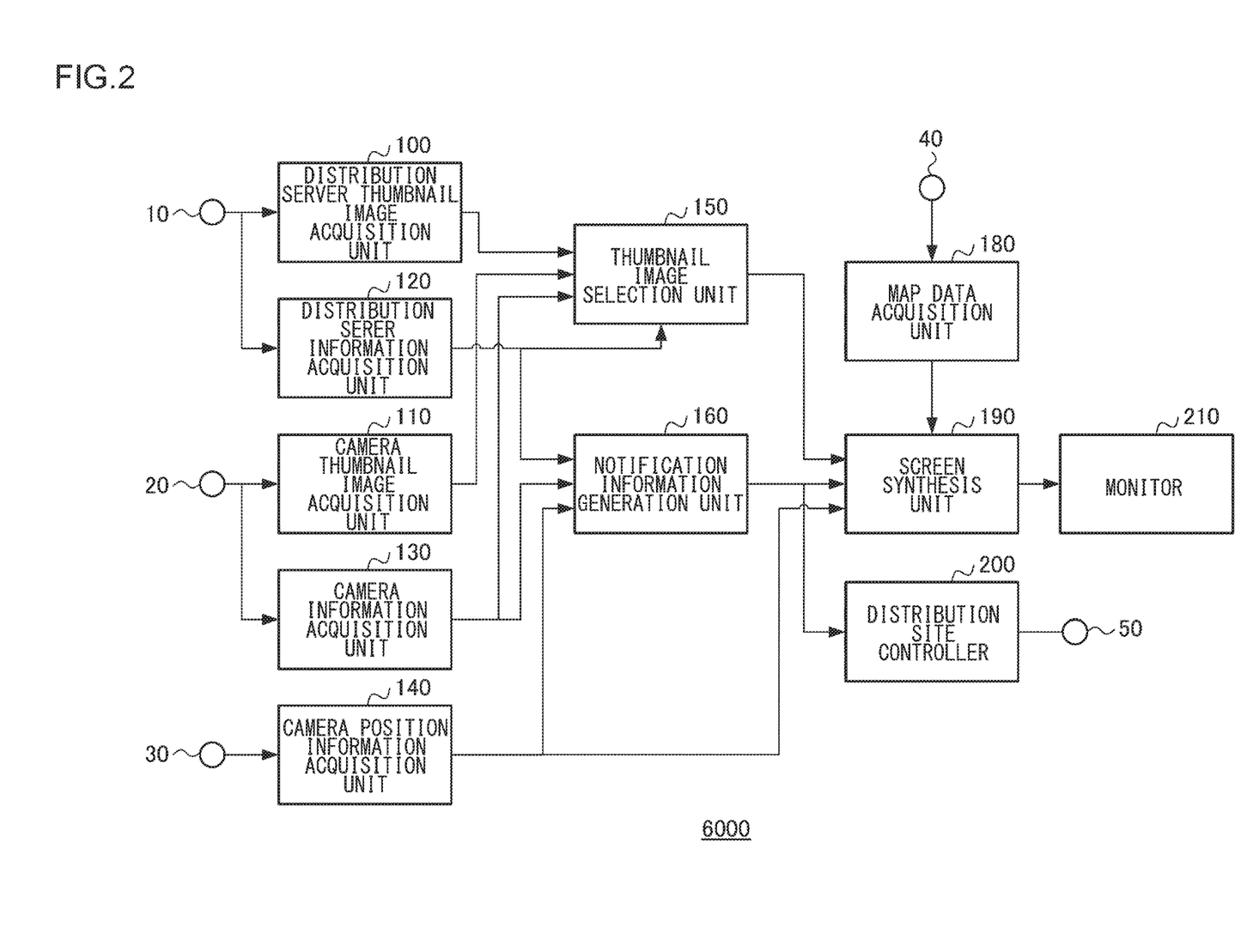
FIG. 2 shows a configuration of the streaming monitoring device of FIG. 1.

FIG. 2 shows a configuration of the streaming monitoring device 6000.

The streaming monitoring device 6000 includes a distribution server thumbnail image acquisition unit 100, a camera thumbnail image acquisition unit 110, a distribution server information acquisition unit 120, a camera information acquisition unit 130, a camera position information acquisition unit 140, a thumbnail image selection unit 150, a notification information generation unit 160, a map data acquisition unit 180, a screen synthesis unit 190, a distribution site controller 200, and a monitor 210. The distribution server thumbnail image acquisition unit 100, the camera thumbnail image acquisition unit 110, the distribution server information acquisition unit 120, the camera information acquisition unit 130, the camera position information acquisition unit 140, the thumbnail image selection unit 150, the notification information generation unit 160, the map data acquisition unit 180, the screen synthesis unit 190, and the distribution site controller 200 may be comprised of a CPU, RAM, or ROM, or comprised of a combination of these.

The distribution server thumbnail image acquisition unit 100 and the distribution server information acquisition unit 120 are described here as being separate, but the distribution server thumbnail image acquisition unit 100 and the distribution server information acquisition unit 120 may be integrated. Similarly, the camera thumbnail image acquisition unit 110 and the camera information acquisition unit 130 may be integrated.

The streaming monitoring device 6000 may be configured as a server-client system. In this case, the screen synthesis unit 190 and the monitor 210 are provided on the client side. The screen synthesis unit 190 of the client functions as a browser, receives map data, image data, and notification information from a server via a network, and synthesizes the image and the notification information on the map, and displays the synthesized result on the monitor 210. The description here relates to a configuration in which the streaming monitoring device 6000 includes the map data acquisition unit 180. When the map data is received from an external server, the streaming monitoring device 6000 may not include the map data acquisition unit 180, and the screen synthesis unit 190 of the client may function as a browser, acquire the map data from the external server, display the map in the screen, and synthesize the image and the notification information on the map. Further, in the case the processing load is distributed to the distribution server, the distribution server thumbnail image acquisition unit 100, the distribution server information acquisition unit 120, and the thumbnail image selection unit 150 may be provided on the client side.

A terminal 10 is connected to the distribution server 3000, a terminal 20 is connected to the router 2000 equipped with GPS functions, a terminal 30 is connected to the camera position management server 4000, a terminal 40 is connected to the map data distribution server 5000, and a terminal 50 is connected to the distribution server 3000.

The distribution server thumbnail image acquisition unit 100 acquires a "streaming thumbnail image" or a "distribution thumbnail image" from the terminal 10 connected to the distribution server 3000 and outputs the acquired image to the thumbnail image selection unit 150.

The distribution server information acquisition unit 120 acquires distribution server information from the terminal 10 connected to the distribution server 3000 and outputs the distribution server information to the thumbnail image selection unit 150 and the notification information generation unit 160.

The distribution server information includes "distribution execution information" indicating whether the distribution server 3000 is distributing the streaming data of the cameras 1000, 1001, and "streaming information" indicating the transmission quality of the streaming data of the cameras 1000, 1001 such as bit rate, delay time, and lost and recovered packets. Information on lost and recovered packets include a sum of packets since the start of streaming up to the present and a sum of packets during a predetermined, immediately preceding period of time. The value of lost packets (hereinafter, "packet loss") is determined by subtracting the number of packets received from the receiver from the number of packets transmitted from the transmitter.

The camera thumbnail image acquisition unit 110 acquires a "camera thumbnail image" from the terminal 20 connected to the router 2000 equipped with GPS functions and outputs the acquired image to the thumbnail image selection unit 150.

The camera information acquisition unit 130 acquires camera information from the terminal 20 connected to the router 2000 equipped with GPS functions and outputs the acquired camera information to the thumbnail image selection unit 150 and the notification information generation unit 160. It is noted that the camera information acquisition unit 130 acquires the camera information from the cameras 1000, 1001 using the WEB API.

The camera information includes "camera identification information" for identifying the cameras 1000, 1001, "streaming execution information" indicating whether the cameras 1000, 1001 are streaming, "streaming subject information" indicating the URL of the destination of streaming when the cameras 1000, 1001 are streaming, and "camera error information" indicating low storage capacity or low battery level in the cameras 1000, 1001. The camera identification information includes a serial number unique to the camera, a user-configurable camera name, etc. It is assumed here that the "streaming subject information" includes a URL representing the cameras 1000, 1001 and a URL representing the distribution server 3000.

The thumbnail image selection unit 150 refers to the "streaming execution information" input from the camera information acquisition unit 130 to determine whether the cameras 1000, 1001 are streaming. When the cameras 1000, 1001 are streaming, the thumbnail image selection unit 150 refers to the "distribution execution information" input from the distribution server information acquisition unit 120 to determine whether the distribution server 3000 is distributing the streaming data of the cameras 1000, 1001.

When the distribution server 3000 are distributing the streaming data of the cameras 1000, 1001, the thumbnail image selection unit 150 selects the "distribution thumbnail image" input from the distribution server thumbnail image acquisition unit 100 as the thumbnail image that should be synthesized in the screen (referred to as "selected thumbnail image") and outputs the selected thumbnail image to the screen synthesis unit 190.

When the distribution server 3000 is not distributing the streaming data of the cameras 1000, 1001, the thumbnail image selection unit 150 selects the "streaming thumbnail image" input from the distribution server thumbnail image acquisition unit 100 as the thumb nail image that should be synthesized in the screen and outputs the selected thumbnail image to the screen synthesis unit 190.

When the cameras 1000, 1001 are not streaming, the thumbnail image selection unit 150 selects the "camera thumbnail image" input from the camera thumbnail image acquisition unit 110 as the thumbnail image that should be synthesized in the screen and outputs the selected thumbnail image to the screen synthesis unit 190.

The camera position information acquisition unit 140 acquires the camera position information from the terminal 30 connected to the camera position management server 4000 and outputs the camera position information to the notification information generation unit 160 and the screen synthesis unit 190.

The map data acquisition unit 180 acquires map data from the terminal 40 connected to the map data distribution server 5000 and outputs the map data to the screen synthesis unit 190.

The notification information generation unit 160 uses the streaming information input from the distribution server information acquisition unit 120, the camera information input from the camera information acquisition unit 130, and the camera position information input from the camera position information acquisition unit 140 to generate the notification information and outputs the notification information to the screen synthesis unit 190 and the distribution site controller 200 along with the streaming information, camera information, and camera position information.

The screen synthesis unit 190 synthesizes the selected thumbnail image input from the thumbnail image selection unit 150 and the notification information input from the notification information generation unit 160 on the map data input from the map data acquisition unit 180 and displays the synthesized result on the monitor 210.

The distribution site controller 200 outputs the streaming information input from the notification information generation unit 160 to the terminal 50 connected to the distribution server 3000. The distribution server 3000 refers to the streaming information and selects the distribution sites 7000, 7001 in accordance with the situation of communication.

Figure 3:
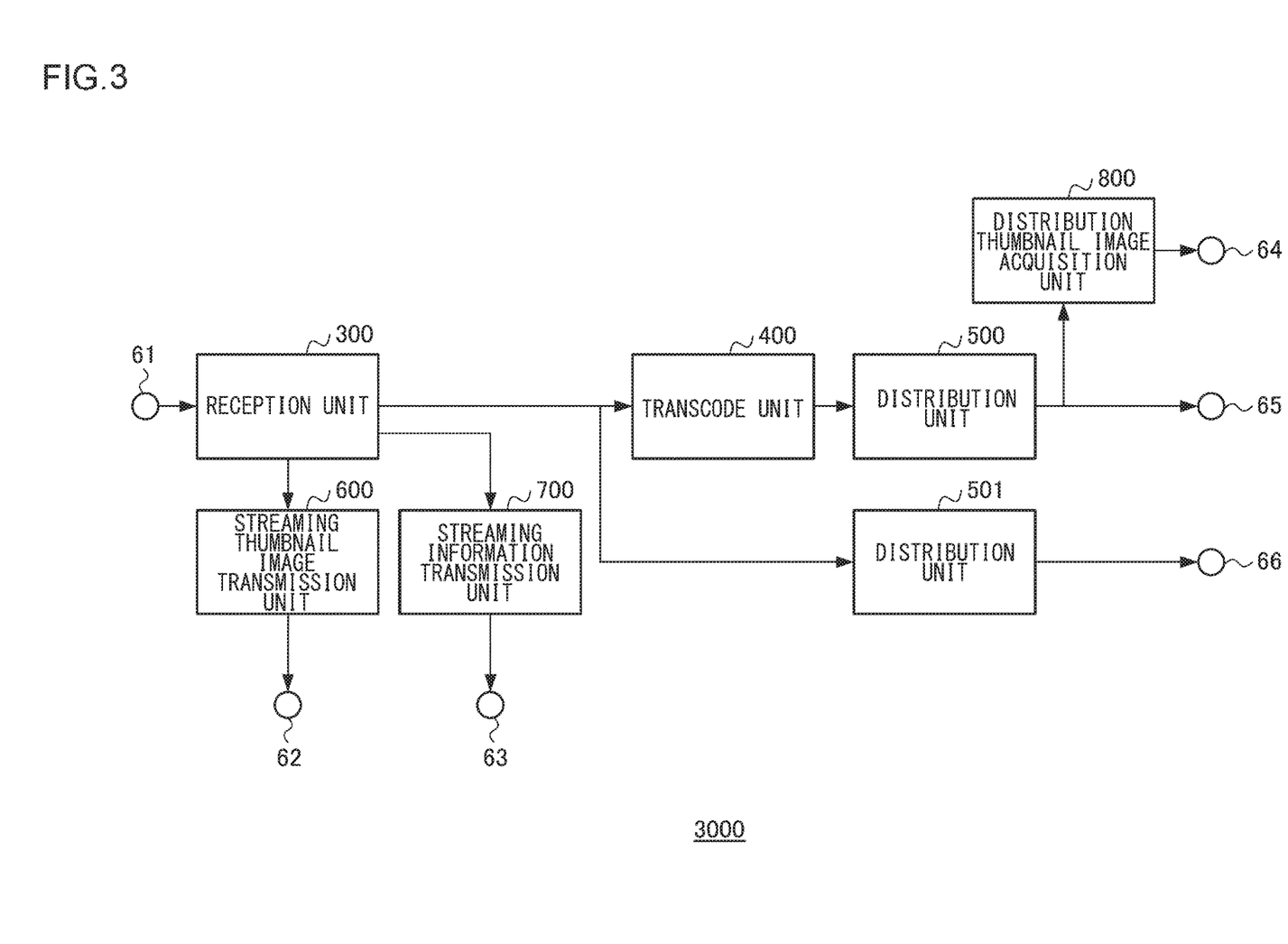
FIG. 3 shows a configuration of the streaming data distribution server of FIG. 1.

FIG. 3 shows a configuration of the distribution server 3000.

The distribution server 3000 includes a reception unit 300, a transcode unit 400, distribution units 500, 501, a streaming thumbnail image transmission unit 600, a streaming information transmission unit 700, and a distribution thumbnail image transmission unit 800.

A terminal 61 is connected to the router 2000 equipped with GPS functions, terminals 62, 63, and 64 are connected to the streaming monitoring device 6000, a terminal 65 is connected to the distribution site 7000, and a terminal 66 is connected to the distribution site 7001.

The reception unit 300 outputs the streaming data input from the terminal 61 connected to the router 2000 equipped with GPS functions to the transcode unit 400 and the distribution unit 501. Further, the reception unit 300 generates a streaming thumbnail image by extracting a still image for one frame from the received streaming data as necessary and outputs the streaming thumbnail image to the streaming thumbnail image transmission unit 600. The streaming thumbnail image is, for example, a still image of the QVCA size. The streaming thumbnail image may be generated at predetermined intervals. For example, the streaming thumbnail image is generated at intervals of three seconds. The reception unit 300 outputs streaming information indicating the transmission quality of the streaming data such as bit rate, delay time, and packet loss to the streaming information transmission unit 700.

The transcode unit 400 transcodes the streaming data of a bit rate A input from the reception unit 300 to produce an encoded stream of a bit rate B and outputs the encoded stream to the distribution unit 500.

The distribution unit 500 outputs the encoded stream input from the transcode unit 400 to the terminal 65 connected to the distribution site 7000. Further, the distribution unit 500 generates a distribution thumbnail image by extracting a still image for one frame from the encoded stream as necessary and outputs the distribution thumbnail image to the distribution thumbnail image transmission unit 800. The distribution thumbnail image is, for example, a still image of the QVCA size. The distribution thumbnail image may be generated at predetermined intervals. For example, the streaming thumbnail image is generated at intervals of three seconds.

The distribution unit 501 outputs the streaming data input from the reception unit 300 to the terminal 66 connected to the distribution site 7001 as necessary.

The streaming thumbnail image transmission unit 600 outputs the streaming thumbnail image input from the reception unit 300 to the terminal 62 connected to the streaming monitoring device 6000.

The distribution thumbnail image transmission unit 800 outputs the distribution thumbnail image input from the distribution unit 500 to the terminal 64 connected to the streaming monitoring device 6000.

When the distribution server 3000 is distributing streaming data, the distribution thumbnail image transmission unit 800 provides the distribution thumbnail image of the transcoded, encoded stream to the streaming monitoring device 6000. When the distribution server 3000 is not distributing streaming data, the streaming thumbnail image transmission unit 600 provides the streaming thumbnail image of the pre-transcoded streaming data to the streaming monitoring device 6000.

The streaming information transmission unit 700 outputs the streaming information to the terminal 63 connected to the streaming monitoring device 6000.

Figure 4:
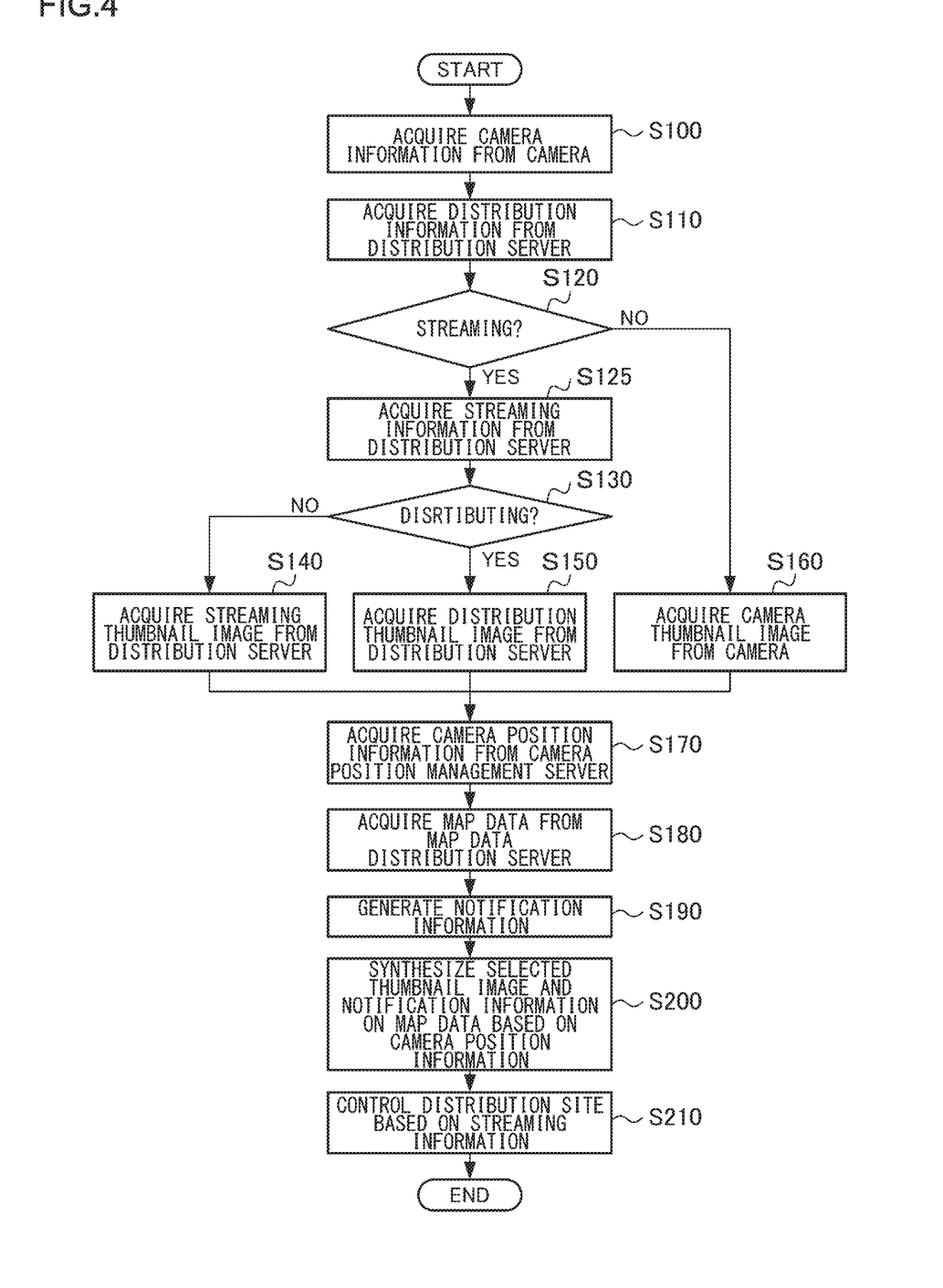
FIG. 4 is a flowchart showing the steps of managing streaming data by the streaming monitoring device of FIG. 2.

FIG. 4 is a flowchart showing the steps of managing streaming data by the streaming monitoring device 6000. These steps of management are performed at update intervals of three seconds for the cameras 1000, 1001. A description will now be given of the case of the camera 1000.

The camera information acquisition unit 130 acquires the camera information on the camera 1000 from the router 2000 equipped with GPS functions and outputs the camera information to the thumbnail image selection unit 150 and the notification information generation unit 160 (S100). The camera information includes the identification information on the cameras 1000, the streaming execution information indicating whether the camera 1000 is streaming and the error information on the camera 1000.

The distribution server information acquisition unit 120 acquires the distribution server information from the distribution server 3000 and outputs the distribution server information to the thumbnail image selection unit 150 and the notification information generation unit 160 (S110). The distribution server information includes the distribution execution information indicating whether the distribution server 3000 is distributing the streaming data of the camera 1000 and the streaming information indicating the transmission quality of the streaming data.

The thumbnail image selection unit 150 checks whether the streaming execution information indicates that the camera 1000 is streaming (S120).

When the streaming execution information indicates that the camera 1000 is streaming (YES in S120), the distribution server information acquisition unit 120 acquires the streaming information from the distribution server 3000 and outputs the streaming information to the notification information generation unit 160 (S125).

Subsequently, the thumbnail image selection unit 150 checks whether the distribution execution information indicates that the distribution server 3000 is distributing the streaming data of the camera 1000 (S130).

When the distribution execution information indicates that the distribution server 3000 is distributing the streaming data of the camera 1000 (YES in S130), the distribution server thumbnail image acquisition unit 100 acquires the distribution thumbnail image from the distribution server 3000, and the thumbnail image selection unit 150 selects the distribution thumbnail image as the selected thumbnail image and outputs the selected image to the screen synthesis unit 190 (S150).

When the distribution execution information does not indicate that the distribution server 3000 is distributing the streaming data of the camera 1000 (NO in S130), the distribution server thumbnail image acquisition unit 100 acquires the streaming thumbnail image from the distribution server 3000, and the thumbnail image selection unit 150 selects the streaming thumbnail image as the selected thumbnail image and outputs the selected image to the screen synthesis unit 190 (S140).

When the streaming execution information does not indicate that the camera 1000 is streaming (NO in S120), the camera thumbnail image acquisition unit 110 acquires the camera thumbnail image from the camera 1000, and the thumbnail image selection unit 150 selects the camera thumbnail image as the selected thumbnail image and outputs the selected image to the screen synthesis unit 190 (S160).

Following step S140, S150, or S160, the camera position information acquisition unit 140 acquires the camera position information from the camera position management server 4000 and outputs the camera position information to the notification information generation unit 160 and the screen synthesis unit 190 (S170).

The map data acquisition unit 180 acquires the map data from the map data distribution server 5000 and outputs the map data to the screen synthesis unit 19 (S180).

The notification information generation unit 160 uses the streaming information input from the distribution server information acquisition unit 120, the camera information input from the camera information acquisition unit 130, and the camera position information input from the camera position information acquisition unit 140 to generate the notification information and outputs the notification information to the screen synthesis unit 190 along with the streaming information, camera information, and camera position information (S190).

The screen synthesis unit 190 displays the map data in a map data display area, generates a synthesized screen by synthesizing the selected thumbnail image and the notification information in the map data display area based on the camera position information, and outputs the synthesized screen to the monitor 210 (S200). The monitor 210 displays the synthesized screen. By way of example, the screen of the monitor has the Wide Quad eXtended Graphics Array (WQXGA) size of 2560 pixels×1600 pixels. By way of example, the map data display area is comprised of 2000 pixels×1200 pixels.

The distribution site controller 200 controls the distribution site based on the streaming information (S210). A description will be given of the control of the distribution site. The distribution site controller 200 transmits the streaming information to the distribution server 3000, and the distribution server 3000 refers to the streaming information and causes the distribution sites 7000, 7001 to be selected as the destination of distribution of streaming data in accordance with the situation of communication. For example, when the sum of lost packets indicated in the streaming information exceeds a predetermined value, the distribution server 3000 switches the destination of distribution of the streaming data hitherto distributed to the distribution site 7000 to the other distribution site 7001.

As described above, when the cameras 1000, 1001 are streaming, the thumbnail image is acquired from the distribution server 3000. When the cameras 1000, 1001 are not streaming, i.e., when the cameras 1000, 1001 are in standby state such as a preview mode in which the streaming data is not streamed, the thumbnail image is acquired from the cameras 1000, 1001. This makes it unnecessary for the cameras 1000, 1001 to encode the streaming data and encode the thumbnail image at the same time. Therefore, the streaming monitoring device 6000 can monitor images taken by the cameras while, at the same time, controlling the processing volume of the cameras 1000, 1001 during streaming.

The streaming execution information is described as being included in the camera information. Alternatively, the streaming execution information may be included in the distribution server information. In this case, the distribution server 3000 determines whether streaming is executed by monitoring the situation of reception of streaming from the router 2000 equipped with GPS functions and generates the distribution server information including the streaming execution information. The distribution server information acquisition unit 120 acquires the distribution server information from the terminal 10 and outputs the distribution server information to the thumbnail image selection unit 150 and the notification information generation unit 160. With this configuration, the processing load on the cameras is reduced.

The update interval of the thumbnail image is described as being three seconds. The update interval is not limited to this so long as it is possible to synthesize the selected thumbnail image and the notification information in the map data display area at predetermined update intervals based on the camera position information. For example, when the streaming thumbnail image and the distribution thumbnail image are used as the selected thumbnail image, it is possible, by using an update interval of one second, which is shorter than when the camera thumbnail image is used as the selected thumbnail image, to monitor images taken by the cameras with a high precision while, at the same time, controlling the processing volume of the camera during streaming.

The image size of the thumbnail image is described as being QVGA. However, the image size of the thumbnail image is not limited to this so long as it is possible to synthesize and display the selected thumbnail image and the notification information in the map data display area at predetermined update intervals based on the camera position information. For example, when the distribution thumbnail image is used as the selected thumbnail image, it is possible to monitor images taken by the cameras with a high precision while, at the same time, controlling the processing volume of the camera during streaming, by using VGA, which is an image size larger than when the camera thumbnail image is used as the selected thumbnail image.

The distribution server thumbnail image acquisition unit 100 is described as acquiring the distribution thumbnail image from the distribution server 3000 (S150) when the distribution execution information indicates that the distribution server 3000 is distributing the streaming data of the camera 1000 (YES in S130). Further, the distribution server thumbnail image acquisition unit 100 is described as acquiring the streaming thumbnail image from the distribution server 3000 (S140) when the distribution execution information does not indicate that the distribution server 3000 is distributing the streaming data of the camera 1000 (NO in S130). However, the distribution server thumbnail image acquisition unit 100 may not be able to acquire the distribution thumbnail image or the streaming thumbnail image from the distribution server 3000. For example, this occurs when the distribution thumbnail image or the streaming thumbnail image cannot be acquired from the distribution server 3000 due to the situation of communication that has grown poorer, or when a distribution server that cannot acquire the distribution thumbnail image or the streaming thumbnail image is selected.

Therefore, the thumbnail image selection unit 150 may be provided with a storage unit (not shown). The storage unit stores a predefined image. A predefined image is, for example, an image that gives an alert such as "the thumbnail image cannot be acquired".

Where such a feature is provided, and where the distribution server thumbnail image acquisition unit 100 is configured to acquire the distribution thumbnail image from the distribution server 3000 (S150), the distribution server thumbnail image acquisition unit 100 may read the predefined image from the storage and selects the predefined image as the selected thumbnail image when the distribution thumbnail image cannot be acquired from the distribution server 3000.

Where the distribution server thumbnail image acquisition unit 100 is configured to acquire the streaming thumbnail image from the distribution server 3000 (S140), the distribution server thumbnail image acquisition unit 100 may read the predefined image from the storage and selects the predefined image as the selected thumbnail image when the streaming thumbnail image cannot be acquired from the distribution server 3000.

Where the thumbnail image selection unit 150 is provided with the storage unit described above, this embodiment can be applied to the distribution server 3000 not provided with the streaming thumbnail image transmission unit 600 and the distribution thumbnail image transmission unit 800. In other words, the distribution server may be identified from the streaming subject information including the URL indicating the distribution server, and a determination as to whether the distribution thumbnail image can be acquired from the distribution server 3000 may be made by examining whether the identified server is a server provided with the streaming thumbnail image transmission unit 600 and the distribution thumbnail image transmission unit 800. In the case of a server provided with the streaming thumbnail image transmission unit 600 and the distribution thumbnail image transmission unit 800, the streaming thumbnail image or the distribution thumbnail image may be selected as the selected thumbnail image and, otherwise, the predefined image may be selected as the selected thumbnail image. By employing this feature, the versatility is enhanced.

It is assumed here that the storage unit for storing the predefined image is provided. Alternatively, the storage unit may not be provided. In this case, when the streaming thumbnail image or the distribution thumbnail image cannot be acquired from the distribution server 3000 in S140 or S150, a character string signifying the streaming subject information (e.g., streaming subject information or a character string short for the streaming subject information), instead of the selected thumbnail image, may be synthesized with the notification information in the map data display area to produce the synthesized screen, and the synthesized screen may be output to the monitor 210.

A detailed description will now be given of a method of synthesizing the selected thumbnail image and the notification information on the map data based on the camera position information and displaying the synthesized result.

Figure 5:
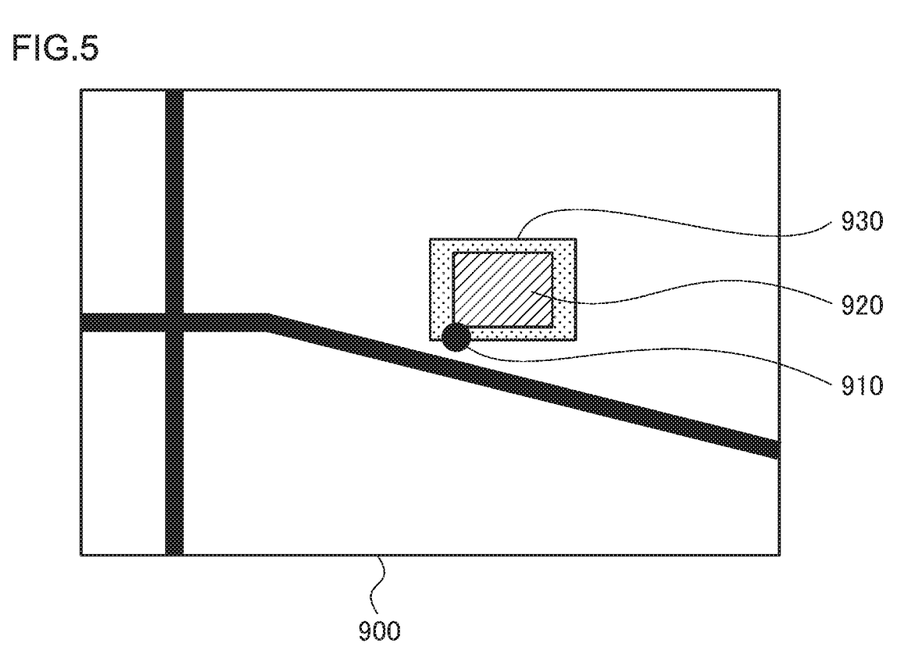
FIG. 5 shows an example of synthesis and display performed by the screen synthesis unit of FIG. 2.

FIG. 5 shows an example of synthesis and display performed by the screen synthesis unit 190. A camera position marker 910 indicating the camera position is displayed on map data 900 based on the camera position information. A selected thumbnail image 920 is displayed adjacent to the camera position marker 910, and the notification image is displayed in a notification information display area 930 around the outer frame of the selected thumbnail image 920.

A detailed description will be given of the notification information. The notification information generation unit 160 generates the notification information according to the following condition. The notification information includes a packet loss error notification, packet loss alert notification, packet recovery alert notification, camera error notification, and lost camera position notification. The notifications are managed by notification types and can be discriminated from each other by the notification type.

When the sum of lost packets during a predetermined, immediately preceding period indicated in the streaming information exceeds a predetermined threshold value T1, a packet loss error notification is generated.

When the sum of lost packets during a predetermined, immediately preceding period indicated in the streaming information exceeds a predetermined threshold value T2(T2<T1), a packet loss alert notification is generated.

When the sum of recovered packets since the start of streaming up to the present time indicated in the streaming information exceeds a predetermined threshold value T3(T3>T1), a packet recovery alert notification is generated.

When the camera information indicates an error, a camera error notification is generated. The camera error information includes low battery, low memory card capacity, failure of streaming, etc.

When the camera position information cannot be acquired, or when the camera position information represents an illegitimate value, a lost camera position notification is generated. The last position, for which the camera position information of the relevant camera was acquired, is used as the camera position information in the case the camera position information cannot be acquired, or the camera position information represents an illegitimate value. A predetermined camera position may be used as the camera position information when the camera position information cannot be acquired or when the camera position information represents an illegitimate value.

By way of example, the notification type is presented in a character string in the notification information display area 930 of FIG. 5 and is provided with a background color. In the absence of the notification information, nothing is displayed in the notification information display area 930. The color of the character string and the background color displayed in the notification information display area 930 change in accordance with the importance of the notification type and flash at predetermined intervals. The predetermined flash interval may vary depending on the importance. The background color may be red in the case of an alert and yellow in the case of caution. This allows the user to understand which camera in an area shown on the map has a problem at a glance.

A click in the thumbnail image display area of FIG. 5 identifies the camera taking a video based on the camera identification information associated with the thumbnail image displayed at the clicked position and pops up the video streamed by the identified camera on the screen as a streaming video detail check screen.

By way of example, the streaming video detail check screen has the full HD size of 1920 pixels×1080 pixels and is displayed at a frame rate of 30 fps. The streaming video detail check screen is used to check the video being streamed in detail. The image size and frame rate of the streaming data are larger than the image size and frame rate of the thumbnail image. However, the streaming data may be scaled to, for example, 640 pixels×480 pixels and displayed accordingly.

The camera information, camera position information, streaming information, and notification information are displayed in character strings in the streaming video detail check screen to enable checking. The notification information is colored and displayed in association with the character string displayed in the notification information display area 930.

As described above, the camera position, images taken, and notification information can be concurrently monitored by synthesizing and displaying the thumbnail image and the notification information on the map data based on the camera position information.

The above-described processes can of course be implemented by hardware-based apparatus such as a CPU and a memory and can also be implemented by firmware stored in a read-only memory (ROM), a flash memory, etc., or by software on a computer, etc. The firmware program or the software program may be made available on, for example, a computer readable recording medium. Alternatively, the program may be made available from a server via a wired or wireless network. Still alternatively, the program may be made available in the form of data broadcast over terrestrial or satellite digital broadcast systems.

Described above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. A video streaming monitoring device for monitoring video data streaming from a camera to a distribution server, comprising:
   a first thumbnail image acquisition unit that acquires a first thumbnail image from the camera;
   a second thumbnail image acquisition unit that acquires one of a transcoded second thumbnail image and a non-transcoded second thumbnail image from the distribution server;
   a thumbnail image selection unit that selects one of the first thumbnail image, the transcoded second thumbnail image, and the non-transcoded second thumbnail image as a thumbnail image that is displayed;
   a camera information acquisition unit that acquires from the camera, camera information including streaming execution information indicating whether the camera is streaming; and
   a distribution server information acquisition unit that acquires from the distribution server, distribution server information including distribution execution information indicating whether the distribution server is distributing,
   wherein the thumbnail image selection unit refers to the streaming execution information and the distribution execution information to select:
   the transcoded second thumbnail image as the thumbnail image that is displayed when the camera is streaming and when the distribution server is distributing,
   the non-transcoded second thumbnail image as the thumbnail image that is displayed when the camera is streaming and when the distribution server is not distributing, and
   the first thumbnail image as the thumbnail image that is displayed when the camera is not streaming.

2. The video data streaming monitoring device according to claim 1, wherein the distribution server information acquisition unit acquires distribution server information including streaming information indicating a transmission quality of streaming from the camera to the distribution server, and
   further comprising a distribution site controller that switches a site to which a video is distributed, based on the streaming information.

3. A terminal device connected to a video data streaming monitoring device for monitoring video data streaming from a camera to a distribution server via a network, the terminal device comprising:
   a synthesis unit that synthesizes, on a map, a thumbnail image of a video taken by a camera adjacent to a camera position on the map and attaches notification information to the thumbnail image for display, the notification information including a transmission quality of streaming from the camera to the distribution server or error information on the camera, wherein:
   the thumbnail image is transcoded and is transmitted from the distribution server when the camera is streaming and when the distribution server is distributing,
   the thumbnail image is not transcoded is transmitted from the distribution server when the camera is streaming and when the distribution server is not distributing, and
   the thumbnail image is transmitted from the camera when the camera is not streaming.

4. A video data streaming monitoring system comprising:
   a video data streaming monitoring device for monitoring video data streaming from a camera to a distribution server; and
   a terminal device connected to the video data streaming monitoring device via a network,
   wherein the video data streaming monitoring device comprises:
   a first thumbnail image acquisition unit that acquires a first thumbnail image from the camera;
   a second thumbnail image acquisition unit that acquires one of a transcoded second thumbnail image and a non-transcoded second thumbnail image from the distribution server;
   a thumbnail image selection unit that selects one of the first thumbnail image, the transcoded second thumbnail image, and the non-transcoded second thumbnail image as a thumbnail image that is displayed;
   a camera information acquisition unit that acquires from the camera, camera information including streaming execution information indicating whether the camera is streaming; and
   a distribution server information acquisition unit that acquires from the distribution server, distribution server information including distribution execution information indicating whether the distribution server is distributing,
   wherein the thumbnail image selection unit refers to the streaming execution information and the distribution execution information to select:

the transcoded second thumbnail image as the thumbnail image that is displayed when the camera is streaming and when the distribution server is distributing, the non-transcoded second thumbnail image as the thumbnail image that is displayed when the camera is streaming and when the distribution server is not distributing, and the first thumbnail image as the thumbnail image that is displayed when the camera is not streaming, and wherein the terminal device comprises:
a synthesis unit that synthesizes, on a map, the first thumbnail image, the transcoded second thumbnail image, or the non-transcoded second thumbnail image selected by the thumbnail image selection unit adjacent to a camera position on the map and attaches notification information to the first thumbnail image, the transcoded second thumbnail image, or the non-transcoded second thumbnail image for display, the notification information including a transmission quality of streaming from the camera to the distribution server or error information on the camera.

5. A video data streaming monitoring method for monitoring video data streaming from a camera to a distribution server, comprising:

acquiring from the camera, camera information including streaming execution information indicating whether the camera is streaming;

acquiring from the distribution server, distribution server information including distribution execution information indicating whether the distribution server is distributing; and referring to the streaming execution information and the distribution execution information to select:
a transcoded second thumbnail image acquired from the distribution server as a thumbnail image that is displayed when the camera is streaming and when the distribution server is distributing,
a non-transcoded second thumbnail image acquired from the distribution server as the thumbnail image that is displayed when the camera is streaming and when the distribution server is not distributing, and
a first thumbnail image acquired from the camera as the thumbnail image that is displayed when the camera is not streaming.

6. A non-transitory computer-readable medium having a video data streaming monitoring program for monitoring video data streaming from a camera to a distribution server that, in response to execution, causes a computer to perform operations comprising:

acquiring, by a first acquiring module from the camera, camera information including streaming execution information indicating whether the camera is streaming;

acquiring, by a second acquiring module from the distribution server, distribution server information including distribution execution information indicating whether the distribution server is distributing; and selecting, by a thumbnail image selection module that refers to the streaming execution information and the distribution execution information:
a transcoded second thumbnail image acquired from the distribution server as a thumbnail image that is displayed when the camera is streaming and when the distribution server is distributing,
a non-transcoded second thumbnail image acquired from the distribution server as the thumbnail image that is displayed when the camera is streaming and when the distribution server is not distributing, and
a first thumbnail image acquired from the camera as the thumbnail image that is displayed when the camera is not streaming.

7. A non-transitory computer-readable medium having a video data streaming monitoring program for monitoring video data streaming from a camera to a distribution server that, in response to execution, causes a computer to perform operations comprising:

synthesizing, by a display module on a map, a thumbnail image of a video taken by a camera adjacent to a camera position on the map and attaches notification information to the thumbnail image for display, the notification information including a transmission quality of streaming from the camera to the distribution server or error information on the camera, wherein:
the thumbnail image is transcoded and is transmitted from the distribution server when the camera is streaming and when the distribution server is distributing,
the thumbnail image is not transcoded and is transmitted from the distribution server when the camera is streaming and when the distribution server is not distributing, and
the thumbnail image is transmitted from the camera when the camera is not streaming.

* * * * *